3,105,795
9α - FLUORO-15β-HYDROXY-1,4-PREGNADIENES AND PHARMACEUTICAL PREPARATIONS CONTAINING SAME
Arthur Nobile, Livingston, N.J., assignor to Schering Corporation, Bloomfield, N.J., a corporation of New Jersey
No Drawing. Filed Feb. 12, 1957, Ser. No. 639,620
9 Claims. (Cl. 167—65)

The present invention relates to 1,4-pregnadienes characterized by improved adrenocorticoid properties, and particularly by anti-inflammatory and glucocorticoid activity, to pharmaceutical compositions containing the same, and to the manufacture of such 1,4-pregnadienes.

The present invention is a continuation-in-part of my copending applications Serial No. 449,257, filed August 11, 1954; Serial No. 481,279, filed January 11, 1955, now U.S. Patent 2,837,464; Serial No. 492,773, filed March 7, 1955; and Serial No. 513,902, filed June 7, 1955, now abandoned.

I have found that 9α-halo-1,4-pregnadiene-3,20-diones having ketonic oxygen or an 11β-hydroxyl at the 11-position, a hydroxyl or ester group at the 21-position and one or more hydroxyl or acyloxy groups attached to the D-ring, have a higher degree of anti-inflammatory and glucocorticoid activity than the corresponding 4-pregnenes while at the same time possessing a reduced mineralocorticoid activity.

The halogen may be fluorine, chlorine or bromine, of which the fluorine derivatives are preferred, and the invention will accordingly be further described by reference to the 9α-fluoro compounds.

The preferred compounds of the invention are embraced by the following general formula:

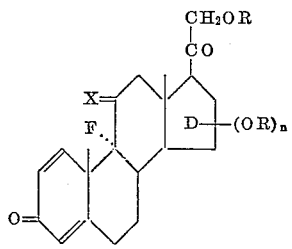

wherein X is a member of the group consisting of (H, β-OH) and ketonic oxygen; and R is a member of the group consisting of hydrogen and acyl groups; while n is a whole number from 1 to 3. The hydroxyl or acyl group or groups attached to the D-ring may be linked to any of the substitutable carbons of such ring, that is, to the 14-, 15-, 16-, and 17-carbons. Of these, the 14- and 17-carbons are tertiary.

My new compounds may be prepared in various ways, either biochemically or chemically. Thus, the 4-pregnene analogues can be subjected to the action of a dehydrogenating microorganism, or of an active enzymatic extract thereof, such as one of the family Corynebacteriaceae, like *Corynebacterium simplex* (A.T.C.C. 6946) and *Corynebacterium hoagii* (A.T.C.C. 7005) or to *Bacillus sphaericus* (A.T.C.C. 7055); or 9α-fluoro-1,4-pregnadiene-11X-21-ol-3,20-diones, may be subjected to the action of cultures of various microorganisms or to chemical treatments whereby an hydroxyl group is introduced at one or more of the 14α-, 15β-, 16α, and 17α-positions.

The compounds employed in my improved pharmaceutical compositions may accordingly have a 14α-, 15β-, 16α-, or 17α-hydroxyl group or two or three of such groups. Thus, the compound may contain, attached to the D-ring, either a 16α-hydroxyl; a 17α-hydroxyl; 17α, 15β-hydroxyls; 17α-, 14α-hydroxyls; 14α-, 15β-hydroxyls; or 14α, 15β, 17α-hydroxyls. In the case of the esters, the ester groups are located at the readily esterifiable positions, namely, at the 15-, 16-, and 21-positions (primary and secondary alcohol esters). The esters are preferably of the lower alkanoic acids, like acetic, propionic, butyric, t-butyl-acetic, valeric, and enanthic; and cycloaliphatically substituted lower alkanoic acids like cyclopentyl and cyclohexyl acetic and propionic acids; but they may also be of aromatic acids, like benzoic, salicylic and veratric acids; and of polybasic acids, like succinic, maleic, phthalic, and in general, of acids capable of forming esters and non-toxic in the dosages employed.

The 14α-hydroxyl derivatives of the 4-pregnenes or 1,4-pregnadienes, whether or not a 17α-hydroxyl group is present, may be obtained by the action of the microorganism, *Helicostylum piriforme* (A.T.C.C. 8992); while the 15β-hydroxyl derivatives can be produced by subjecting the 4-pregnene or 1,4-pregnadiene compounds to the action of a culture of *Bacillus megatherium* (see Example 4). The 4-pregnenes are then converted to 1,4-pregnadienes by the action of a culture of a dehydrogenating organism such as one of those named hereinabove. The 1,2-double bond may be introduced also by chemical agencies, as by first saturating the double bond in known manner to produce the corresponding pregnane compound, and then introducing bromine at the 2- and 4-positions, followed by de-hydro-bromination by heating with an organic base like collidine, lutidine, and the like, as described in the copending application of Eugene P. Oliveto and David H. Gould, Serial No. 466,207, filed November 1, 1954, now U.S. Patent 2,897,216; or by treating the 4-pregnene compound with bromine to form the 6-bromo-derivative, followed by treatment with potassium acetate and rearrangement to produce the 2-acetoxy derivative; the latter is then hydrolyzed and dehydrated to introduce the 1,2-double bond, as disclosed in the copending application of Hershel L. Herzog, Serial No. 481,271, filed January 11, 1955, now U.S. Patent 2,857,406.

The 16α-hydroxyl group may be introduced by chemical means, as by reacting a 9α-fluoro-4-pregnene-11X-17α,21-diol-3,20-dione or a 9α-fluoro-1,4-pregnadiene-11X-17α,21-diol-3,20-dione, where X is as above defined, with a lower alkylene glycol, like ethylene glycol, to form the 3,20-bis-alkylene ketal, followed by dehydration, as with phosphorus oxychloride in pyridine solution, to form the corresponding 16-dehydro compound (devoid of 17α-hydroxyl), hydrolyzing the ketal groups by heating with acid, oxidizing the product in known manner, as with hydrogen peroxide in sodium hydroxide-methanol solution, to the 16α,17α-epoxy derivative, followed by reaction with a reagent capable of opening the epoxide ring to yield a 9α-fluoro-11X-16α,21-diol-3,20-dione, which in the case of the 4-pregnene analogue, is converted to the 1,4-pregnadiene compound by dehydrogenation as described hereinabove. A 17α-hydroxyl may be introduced into 9α-fluoro-4-pregnene-11β,21-diol-3,20-dione and into 9α-fluoro-21-ol-3,11,20-trione, or their 21-esters (followed by dehydrogenation at the 1,2-carbons) or into the corresponding 9α-fluoro-1,4-pregnadiene compounds by treatment with a culture of *Tricothecium roseum*, as described by Meystre et al., Helvetica Chimica Acta, 37, 1548 (1954).

The compounds of the invention are useful for the same purposes as 9α-fluoro-cortisone and 9α-fluoro-hydrocortisone and their 21-esters, but because of their generally higher activity, can be employed in smaller dosages. In addition to being active glucocorticoids, they are effective in controlling electrolyte balance as determined by liver glycogen assays and sodium retention methods. The compounds having a 17α-hydroxyl also possess anti-inflammatory activity.

The compounds of the present invention can be administered by mouth in the form of tablets containing, for example, 1 to 5 mg. of the diene mixed with a non-toxic, pharmaceutical carrier containing one or more starches, sugars, gums, gelatines, soaps, clays, calcium and magnesium carbonates, and the like. They may, however, also be administered by subcutaneous or intramuscular injection, dissolved or suspended in a suitable non-toxic liquid vehicle; or they can be administered in the solid form by sub-cutaneous implantation, or in the form of suppositories dissolved or suspended in a fatty or waxy vehicle which melts at approximately body temperature. They can also be administered topically in the form of an ointment or cream in which they are dissolved or suspended in an unguent or cream base of known composition; and they may also be employed in the form of ointments and aqueous suspensions for ophthalmic use. The compounds in microcrystalline form in aqueous suspensions can be used for intra-articular injection and also as nasal sprays, while infusions can be prepared for intravenous use.

The initial dose of the compounds of the invention may be limited to about 5 to 10 mg. per day, while the average maintenance dose is about 2 to 5 mg. per day.

The compounds may be administered orally or topically, although they can be administered intravenously or intramuscularly in suspension in water or in an aqueous medium.

Satisfactory procedures for the preparation of the compounds of the invention are presented by way of illustration in the following examples:

EXAMPLE 1

*9α-Fluoro-1,4-Pregnadiene-11β,17α,21-Triol-3,20-Dione*

A 100 ml. broth culture containing a 0.1% yeast extract concentration, 9.0 ml. of 0.2 M $KH_2PO_4$ and 9.0 ml. of 0.2 M $Na_2HPO_4$ contained in a 300 ml. Erlenmeyer flask is seeded with 1 ml. of a 24-hour broth culture of *Corynebacterium simplex*. The flask is incubated at 28° C. for 24 hours. A second 300 ml. Erlenmeyer flask containing 100 mg. of sterile 9α-fluoro-4-pregnene-11β,17α,21-triol-3,20-dione in 5.0 ml. of acetone is incubated with the 24-hour culture of the bacterium. The culture-containing steroid solution is incubated for 48 hours at 28°–30° C.

The culture is then extracted with three equal volumes of chloroform, the extracts combined and concentrated to dryness on a steam bath. Recrystallization of the residue gives 41 mg. of 9α-fluoro-1,4-pregnadiene-11β,17α,21-triol-3,20-dione as a crystalline solid (from acetone), M.P. 247–250° C.

EXAMPLE 2

*Conversion of 9α-Fluoro Compound F to 9α-Fluoro-1,4-Pregnadiene-11β,17α,21-Triol-3,20-Dione*

From a solution of 1 gram yeast extract (Difco) in 1.0 liter of tap water containing 4.4 gm. of potassium dihydrogen phosphate and 8.8 g. of disodium hydrogen phosphate (pH of the solution 6.9), 10 portions of 100 ml. each are withdrawn, placed in 300 ml. Erlenmeyer flasks and sterilized by autoclaving for 15 minutes at 15 lbs. steam pressure (120° C.) After autoclaving and cooling of the broth, one ml. of suspension of *Corynebacterium hoagii* (American Type Culture Collection 7005), is placed in each flask. The flasks are then shaken on a shake table with access of sterile air at 200 r.p.m. and 28° C. for 16½ hours.

Into each of the 10 Erlenmeyer flasks, 50 mg. of 9α-fluoro-4-pregnene-11β,17α,21-triol-3,20-dione, dissolved in 1 ml .of 90% methanol is added aseptically. The flasks are replaced on the shaker and incubated for 7 hours with access of sterile air. The pH at the end of the shake period is 6.82.

The contents of all flasks are combined and extracted with a total of 3 liters of chloroform in 3 equal portions. The combined extracts are concentrated to a residue of 411 mg. Crystallization of the residue from acetone affords 226 mg. of 9α-fluoro-1,4-pregnadiene-11β,17α,21-triol-3,20-dione.

EXAMPLE 3

*9α-Fluoro-1,4-Pregnadiene-17α,21-Diol-3,11,20-Trione*

A broth culture is seeded as described in Example 1, and the reaction is performed using 150 mg. of sterile 9α-fluoro-4-pregnene-17α,21-diol-3,11,20-trione in 5.0 ml. of acetone as substrate. Following the procedure of Example 1, there is obtained 58 mg. of the diene as a crystalline solid.

EXAMPLE 4

A. *9α-Fluoro-4-Pregnene-11β,15β,17α,21-Tetrol-3,20-Dione*

A medium prepared from 10 g. of yeast extract (Difco) and 10 g. of cerelose is diluted to 1 liter with tap water and distributed equally among ten 300 ml. Erlenmeyer flasks. The flasks and contents are sterilized and each is inoculated with 1 ml. of a suspension of *Bacillus megatherium* (Isolate 41, Waksman Collection, Institute of Microbiology, Rutgers University, New Brunswick, New Jersey) from a 24-hour broth culture on nutrient agar. The newly-seeded cultures are incubated and shaked on a shake table for 16 hours at 28° C. at 220 r.p.m. To each of the flasks is added, under sterile conditions, a solution of 50 mg. of 9α-fluoro-4-pregnene-11β,17α,21-triol-3,20-dione in 0.7 ml. of 80% aqueous ethanol and fermentation is permitted to proceed for an additional 36 hours with shaking. At the end of this period, the reaction mixture is extracted with chloroform and the extracts are washed with water, dried and concentrated to a residue. This is recrystallized from aqueous methanol to yield 9α-fluoro-4-pregnene-11β,15β,17α,21-tetrol-3,20-dione.

B. *9α-Fluoro-1,4-Pregnadiene-11β,15β,17α,21-Tetrol-3,20-Dione*

*Bacillus sphaericus* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28° C.

To 100 ml. of a sterile nutrient broth (composed of Bacto-beef extract, 3 g.; Bacto-peptone, 5 g.; per liter of tap water) in a 300 ml. flask is added 1 ml. of the incubated culture and the broth mixture is further incubated for 24 hours at 28° C., on a shaking machine. The broth culture so obtained is employed as an inoculum.

Into each of 10 flasks containing 100 ml. of sterile nutrient broth is added 1 ml. of the inoculum. The flasks are agitated on a rotary shaker for 8 hours at 28° C. at 240 strokes per minute. At the end of this growth period, a solution of 0.2 g. of 9α-fluoro-4-pregnene-11β,15β,17α,21-tetrol-3,20-dione in 0.5 ml. of ethanol is aseptically added to each flask which, in turn, is reshaken and incubated for an additional 24 hours.

The contents of the flasks are then combined and extracted three times with 2 liters of chloroform for each extraction. The combined chloroform extracts are evaporated to dryness and the residue is recrystallized from acetone, yielding 0.1 g. of the corresponding 1,4-pregnadiene compound.

EXAMPLE 5

*9α-Fluoro-1,4-Pregnadiene-11β,14α,17α,21-Tetrol-3,20-Dione*

A medium is prepared of twenty grams of Edamine enzymatic digest of lactalbumin, three grams of corn steep liquor and fifty grams of technical dextrose dilutes to one liter with tap water and adjusted with sodium hydroxide to a pH of 4.3 to 4.5. Twelve liters of this medium after sterilization is inoculated with spores of *Helicostylum piriforme* (A.T.C.C. 8992), and incubated for 24 hours at a temperature of 28° C. using a rate of aeration and stirring such that the oxygen uptake of 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Helicostylum piriforme* is added 1.5 g. of 9α - fluoro-1,4-pregnadiene-11β,17α,21-triol-3,20-dione in a minimum of ethanol to provide a suspension of the steroid in the culture. After an additional 24-hour period of incubation under the same conditions of temperature and aeration, the beer and mycelium are extracted with methylene chloride. The mycelium is filtered, washed twice, each time with a volume of acetone approximately equal to the volume of the mycelium, and extracted twice, each time with a volume of methylene chloride approximately equal to the volume of the mycelium. The acetone and methylene chloride extracts including solvent are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a two percent aqueous solution of sodium bicarbonate and then with two one-tenth by volume portions of water. After drying the methylene chloride extracts with about five grams of anhydrous sodium sulfate per liter of solvent and filtering, the solvent is removed by distillation. The residue is dissolved in a minimum of methylene chloride, filtered, and the solvent then evaporated. The resulting crude crystals are dried and then washed five times with five-milliliter portions of ether per gram of crude crystals, yielding 1.76 grams of residue. The residue is crystallized from acetone-hexane to yield 0.75 g. of 9α-fluoro-1,4-pregnadiene-11β,14α,17α,21-tetrol-3,20-dione.

EXAMPLE 6

*9α-Fluoro-1,4-Pregnadiene-11β,14α,15β,17α,21-Pentol-3,20-Dione*

In the manner described in Example 5, 0.5 g. of 9α-fluoro - 4 - pregnene - 11β,15β,17α,21 - tetrol-3,20-dione is fermented with *Helicostylum piriform* to yield 0.2 g. of 9α-fluoro-4-pregnene-11β,14α,15β,17α,21 - pentol - 3,20-dione. Fermentation of this material with *Corynebacterium simplex* in the manner described hereinabove yields 9α - fluoro - 1,4 - pregnadiene-11β,14α,15β,17α,21-pentol-3,20-dione. Fermentation with *Bacillus sphaericus* yields the same 1,4-pregnadiene.

EXAMPLE 7

A. *9α-Fluoro-Pregnene-11β,16α,21-Triol-3,20-Dione*

A mixture of 1 g. of 9α-fluoro-4-pregnene-11β,17α,21-triol-3,20-dione, 50 ml. of benzene, 5 ml. of ethylene glycol and 0.2 g. of p-toluene sulfonic acid are refluxed for 16 hours with the continuous removal of water. At the end of this time, the organic layer is washed with water several times, dried and evaporated to a residue. This crude residue (3,20-bis-ethylene ketal of 9α-fluoro-4-pregnene-11β,17α,21-triol-3,20-dione) is dissolved in 10 ml. of pyridine containing 0.51 ml. of phosphorus oxychloride and the resulting solution allowed to stand for 14 hours. It is then poured into excess ice-hydrochloric acid and the resulting solid removed by filtration. This material (3,20-bis-ethylene ketal of 9α-fluoro-4,16-pregnadiene-11β,21-diol-3,20-dione) is dissolved in 10 ml. of 80% aqueous acetic acid and warmed on the steam bath for 2 hours. Careful addition of water to the warm solution gives crystals of 9α-fluoro-4,16-pregnadiene-11β,21-diol-3,20-dione. A mixture of 0.6 g. of this compound, 1 ml. of 30% hydrogen peroxide, 0.2 g. sodium hydroxide and 20 ml. of methanol is allowed to react at room temperature for 10 hours. The solvent is then removed by reduced pressure and the residue recrystallized from acetone-hexane to yield 0.5 g. of 16α,17α-epoxy-9α-fluoro-4-pregnene-11β,21-diol-3,20-dione.

To a solution of 0.4 g. of 16α,17α-epoxy-9α-fluoro-4-pregnene-11β,21-diol-3,20-dione in 20 ml. of chloroform is added 0.2 g. of chromous acetate and the mixture is stirred at room temperature overnight. The organic solution is then washed thoroughly with water and evaporated to a residue. Crystallization from acetone-hexane yields 9α-fluoro-4-pregnene-11β,16α,21-triol-3,20-dione.

B. *9α-Fluoro-1,4-Pregnadiene-11β,16α,21-Triol-3,20-Dione*

In the manner described in Example 4B, 0.3 g. of 9α-fluoro-4-pregnene-11β,16α,21-triol-3,20-dione is converted to the corresponding 1,4-pregnadiene.

EXAMPLE 8

A. *9α-Fluoro-4-Pregnene-11β,15β,16α,21-Triol-3,20-Dione*

0.3 g. of 9α-fluoro-4-pregnene-11β,16α,21-triol-3,20-dione is fermented with *Bacillus megatherium* in the manner described in Example 3B. There is obtained 9α-fluoro-4-pregnene-11β,15β,16α,21-triol-3,20-dione.

B. *9α-Fluoro-1,4-Pregnadiene-11β,15β,16α,21-Tetrol-3,20-Dione*

0.5 g. of 9α-fluoro-4-pregnene-11β,15α,16α,21-tetrol-3,20-dione is reacted with *Bacillus sphaericus* in the manner described in Example 4B. The corresponding 1,4-pregnadiene is produced, which is crystallized from aqueous acetone.

EXAMPLE 9

*9α-Fluoro-1,4-Pregnadiene-11β,15β,17α,21-Tetrol-3,20-Dione 15,21-Diacetate*

A solution of 0.1 g. of 9α-fluoro-1,4-pregnadiene-11β,15β,17α,21-tetrol-3,20-dione in 5 ml. of pyridine containing 0.1 ml. of acetic anhydride is allowed to react overnight at room temperature. This is then poured into an excess of ice-hydrochloric acid and extracted repeatedly with methylene chloride. The organic extracts are washed with water, dried and evaporated to a residue. This is crystallized from acetone-hexane, yielding 70 mg. of 9α-fluoro-1,4-pregnadiene-11β,15β,17α,21-tetrol-3,20-dione 15,21-diacetate.

EXAMPLE 10

*9α-Fluoro-1,4-Pregnadiene-11β,14α,17α,21-Tetrol-3,20-Dione 21-Propionate*

A solution of 0.1 g. of 9α-fluoro-1,4-pregnadiene-11β,14α,17α,21-tetrol-3,20-dione in 5 ml. of pyridine containing 0.1 ml. of propionic anhydride is allowed to react overnight at room temperature. The mixture is poured into an excess of ice-hydrochloric acid and filtered. There is obtained 110 mg. of solid material. Crystallization from acetone-hexane gives 75 mg. of 9α-fluoro-1,4-pregnadiene-11β,14α,17α,21-tetrol-3,20-dione 21-propionate.

EXAMPLE 11

*9α-Fluoro-1,4-Pregnadiene-11β,16α,21-Triol-3,20-Dione 16,21-Diacetate*

A solution of 0.2 g. of 9α-fluoro-1,4-pregnadiene-11β,16α,21-triol-3,20-dione in 10 ml. of pyridine containing 0.2 ml. of acetic anhydride is warmed on a steam bath for 15 minutes, then poured into an excess of ice-hydrochloric acid. The mixture is extracted with methylene chloride, washed with water, dried and evaporated. Crystallization from aqueous methanol yields 120 mg. of 9α-fluoro-1,4-pregnadiene-11β,16α,21-triol-3,20-dione 16,21-diacetate.

EXAMPLE 12

9α-Fluoro-1,4-Pregnadiene-14α,17α,21-Triol-3,11,20-Trione

In the manner described in Example 5, 0.4 g. of 9α-fluoro-1,4-pregnadiene-17α,21-diol-3,11,20-trione is added to a culture of *Helicostylum piriforme* and the fermentation conducted as described above. There is obtained 9α-fluoro-1,4-pregnadiene-14α,17α,21-triol-3,11,20-trione.

EXAMPLE 13

9α-Fluoro-1,4-Pregnadiene-15β,17α,21-Triol-3,11,20-Trione 15,21-Diacetate

A solution of 0.1 g. of 9α-fluoro-1,4-pregnadiene-11β,15β,17α,21-tetrol-3,20-dione 15,21-diacetate in 5 ml. of pyridine is combined with a solution of 50 mg. of chromium trioxide in 3 ml. of pyridine and the mixture allowed to stand at room temperature for 8 hours. It is then poured into water and extracted repeatedly with chloroform. The organic extracts are washed with dilute hydrochloric acid and water, then dried and evaporated. The residue is crystallized from acetone-hexane, yielding 50 mg. of 9α-fluoro-1,4-pregnadiene-15β,17α,21-triol-3,11,20-trione 15,21-diacetate.

EXAMPLE 14

9α-Fluoro-1,4-Pregnadiene-11β,16α,21-Triol-3,20-Dione 16,21-Diacetate

A solution of 75 mg. of 9α-fluoro-1,4-pregnadiene-11β,16α,21-triol-3,20-dione is reacted with 50 mg. of acetic anhydride in 3 ml. of pyridine overnight at room temperature. The mixture is then poured into an excess of ice and hydrochloric acid and filtered. The solid thus obtained is crystallized from aqueous acetone. There are obtained 30 mg. of 9α-fluoro-1,4-pregnadiene-11β,16α,21-triol-3,20-dione 16,21-diacetate.

EXAMPLE A

| | Mg./tab. |
|---|---|
| 9α - fluoro-1,4-pregnadiene-17α,21-diol-3,11,20-trione | 2.00 |
| Lactose | 83.85 |
| Starch | 9.50 |
| Gelatin | 1.19 |
| Magnesium stearate | 0.46 |

This mixture provides a tablet for oral use in the treatment of rheumatoid arthritis and kindred conditions.

EXAMPLE B

| | Mg./ml. |
|---|---|
| 9α - fluoro-1,4-pregnadiene-11β,16α,21-triol-3,20-dione | 5.0 |
| Potassium dihydrogen phosphate, C.P. (KH₂PO₄) | 6.0 |
| Disodium hydrogen phosphate, C.P. anh. (Na₂HPO₄) | 12.0 |
| Polysorbate 80, U.S.P. (Tween 80—Atlas) | 0.4 |
| Sorbitan monolaurate (Span 20—Atlas) | 0.4 |
| Thimerosal, N.F. (Merthiolate—Lilly) | 0.1 |
| Water for injection, U.S.P., to make 1.00 ml. | |

This aqueous suspension is suitable for subcutaneous and intramuscular injection, and also as an ophthalmic preparation.

EXAMPLE C

| | Mg./ml. |
|---|---|
| 9α-fluoro-1,4-pregnadiene-11β,15β,17α,21-tetrol-3,20-dione | 5.0 |
| Chloroprophenpyridamine gluconate, Schering | 3.0 |
| D-sorbitol | 43.0 |
| Benzalkonium chloride, U.S.P. | 0.25 |
| Distilled water to make 1.0 ml. | |

The above mixture can be applied as a nasal spray.

EXAMPLE D

| | Mg./ml. |
|---|---|
| 9α-fluoro-1,4-pregnadiene-11β,14α,17α,21-tetrol-3,20-dione | 5.0 |
| Aluminum monostearate | 20.0 |
| Propylparaben, U.S.P. | 1.0 |
| Sesame oil, U.S.P., to make 1.0 ml. | |

This oil can be injected intramuscularly or subcutaneously.

EXAMPLE E

| | Mg./gm. |
|---|---|
| 9α - fluoro-1,4-pregnadiene-11β,14α,15β,17α,21-pentol-3,20-dione | 5.0 |
| Methylparaben, U.S.P. | 1.7 |
| Propylparaben, U.S.P. | 0.3 |
| Liquid petrolatum, U.S.P. | 120.0 |
| Anhydrous lanolin (wool fat), U.S.P. | 200.0 |
| White petrolatum, U.S.P. | 673.0 |

This mixture forms an ointment suitable for ophthalmic uses.

EXAMPLE F

| | Mg./gm. |
|---|---|
| 9α-fluoro-4-pregnene-11β,16α,21-triol-3,20-dione | 5.0 |
| Tetracycline hydrochloride | 5.0 |
| Methylparaben, U.S.P. | 1.7 |
| Propylparaben, U.S.P. | 0.3 |
| Liquid petrolatum, U.S.P. | 120.0 |
| Anhydrous lanolin (wool fat) | 200.0 |
| White petrolatum | 668.0 |

The above provides an antibacterial hormonal ointment suitable for ophthalmic treatment.

EXAMPLE G

| | Mg./gm. |
|---|---|
| 9α - fluoro-1,4-pregnadiene-11β,15β,16α,21-tetrol-3,20-dione | 5.0 |
| Zinc stearate, U.S.P. | 60.9 |
| Polyethylene glycol 6000 (Carbowax 6000) | 122.9 |
| Polyethylene glycol 1500 (Carbowax 1500) | 421.3 |
| Propylene glycol, U.S.P. | 345.2 |
| Distilled water | 45.6 |

This mixture forms a creamy composition for topical use.

EXAMPLE H

| | Mg./gm. |
|---|---|
| 9α-fluoro-1,4-pregnadiene - 15β,17α,21 - triol-3,11,20-trione-15,21-diacetate | 5.0 |
| Tetracycline hydrochloride | 30.0 |
| Neomycin sulfate | 5.0 |
| Zinc stearate, U.S.P. | 60.9 |
| Polyethylene glycol 6000 (Carbowax 6000) | 122.0 |
| Polyethylene glycol 1500 (Carbowax 1500) | 421.3 |
| Propylene glycol, U.S.P. | 345.2 |
| Distilled water | 40.6 |

The above mixture yields a cream suitable for topical application.

The tablets may contain from about 1 to 10 mg. of the pregnadiene, while the dosage of the liquid or semi-liquid preparations is to be adjusted so that from about 1 to 10 mg. will be administered per dose, depending on the frequency of daily administration.

I claim:

1. A compound of the formula:

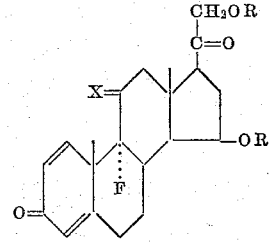

wherein X is a member of the group consisting of O and (H, β-OH) and R is a member of the group consisting of H and lower alkanoyl, said compound having 1 to 2 additional OR groups attached to the D-ring.

2. 9α - fluoro - 1,4 - pregnadiene-11β,15β,17α,21-tetrol-3,20-dione.

3. 9α - fluoro - 1,4 - pregnadiene - 11β,14α,15β,17α,21-pentol-3,20-dione.

4. 9α - fluoro - 1,4-pregnadiene-11β,16α,21-triol-3,20-dione.

5. 9α - fluoro - 1,4 - pregnadiene-11β,15β,16α,21-tetrol-3,20-dione.

6. 9α - fluoro - 1,4-pregnadiene-15β,17α,21-triol-3,11,20-trione.

7. A pharmaceutical preparation comprising a non-toxic pharmaceutical carrier and a member of the group consisting of 15β - hydroxy - 9α - fluoro-1,4-pregnadiene-11X-21-ol-3,20-diones having 1 to 2 additional hydroxy groups attached to the D-ring, and the lower alkanoyl esters thereof, X being a member of the group consisting of (H, β-OH) and O, said pregnadiene being present in the range of 1 to 10 mg. per dosage unit.

8. A pharmaceutical tablet comprising a non-toxic pharmaceutical carrier and 1 to 10 milligrams of a 9α-fluoro-1,4-pregnadiene-11β,15β-21-triol-3,20-dione having 1 to 2 additional hydroxy groups attached to the D-ring.

9. The process which comprises reacting a member of the group consisting of 9α-fluoro-1,4-pregnadiene-11X-17α,21-diol-3,20-diones and their lower alkanoyl esters, wherein X is a member of the group consisting of (H, β-OH) and ketonic oxygen, with a lower alkylene glycol, reacting the resulting 3,20-bis-alkylene glycol ketal with a dehydrating agent to form the corresponding 16-dehydro compound, hydrolyzing the ketal groups, oxidizing the product to the 16α,17α-epoxy derivative, and reacting the product with a reagent capable of opening the epoxide ring to yield a 9α-fluoro-11X-16α,21-diol-3,20-dione.

References Cited in the file of this patent

UNITED STATES PATENTS

| | | |
|---|---|---|
| 2,602,769 | Murray | July 8, 1952 |
| 2,703,806 | Murray | Mar. 8, 1955 |
| 2,705,233 | Julian | Mar. 29, 1955 |
| 2,728,782 | Magerlein et al. | Dec. 27, 1955 |
| 2,773,080 | Bernstein et al. | Dec. 4, 1956 |
| 2,789,118 | Bernstein et al. | Apr. 16, 1957 |